United States Patent [19]

Black, Jr.

[11] Patent Number: 4,542,510

[45] Date of Patent: Sep. 17, 1985

[54] LOW INDUCTANCE MAGNETIC WIGGLER

[75] Inventor: Maurice D. Black, Jr., Simi Valley, Calif.

[73] Assignee: Rockwell International Corporation, El Segundo, Calif.

[21] Appl. No.: 526,744

[22] Filed: Aug. 26, 1983

[51] Int. Cl.⁴ ................................................. H01S 3/00
[52] U.S. Cl. ............................................ 372/2; 372/37; 315/3; 315/4; 315/5; 330/4.3
[58] Field of Search ................. 378/2, 37; 315/3, 4, 315/5; 330/4.3

Primary Examiner—William L. Sikes
Assistant Examiner—Léon Scott, Jr.
Attorney, Agent, or Firm—H. Fredrick Hamann; Harry B. Field

[57] ABSTRACT

A low inductance magnetic wiggler for use in electron beam type lasers generates a high intensity spatially periodic magnetic field. The wiggler is formed as a plurality of closed conductive loops having their centers spaced along a common axis. Adjacent loops are connected by a conductor extending parallel to the axis, the connecting conductors being positioned alternately on diametrically opposite sides of the loops.

5 Claims, 2 Drawing Figures

U.S. Patent  Sep. 17, 1985  4,542,510
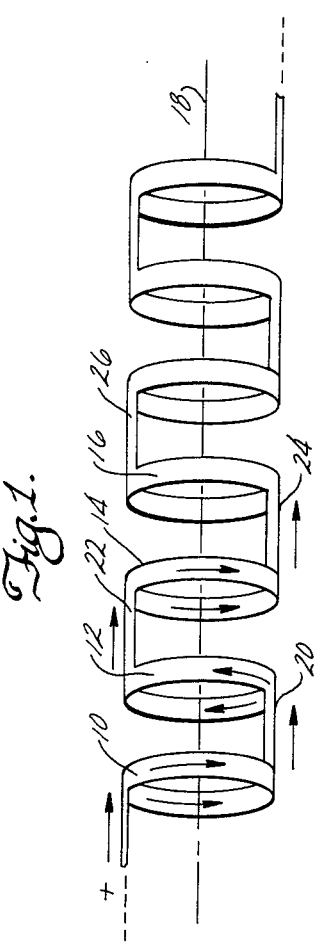
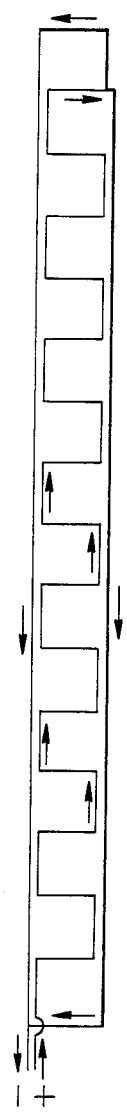

4,542,510

LOW INDUCTANCE MAGNETIC WIGGLER

FIELD OF THE INVENTION

This invention relates to magnetic wigglers used in electron beam type lasers (e.g. free-electron lasers) and, more particularly, to a current driven magnetic wiggler having low inductance.

BACKGROUND OF THE INVENTION

The concept of a free-electron laser is known and has been described. See, for example, "Observation of Stimulated Emission of Radiation by Relativistic Electrons in a Spatially Periodic Transverse Magnetic Field," by Luis R. Elias, William M. Fairbank, John M. J. Madey, H. Alan Schwettman, and Todd I. Smith, *Physical Review Letters,* Vol. 36, pp. 717-720, 29 Mar. 1976. In the free-electron laser, gain of the laser beam is produced by an electron beam passing through a linearly polarized magnetic wiggler. The gain of such a device, according to the equations given in the above-identified reference, is proportional to the product of magnetic flux density squared and the electron density. Gain is also determined by the number of periods and the length of the wiggler. In order to get high energy output from such devices, such as are conceived for producing laser beams with sufficient peak power to trigger a fusion reaction, very long wigglers have been required due to limitations on the achievable intensities of the magnetic fields. Permanent magnet wigglers are capable of supplying only up to two tesla. A superconducting helix has been used but could supply adequate field strength in only a thin annular gain region. The complexities of providing extended gain region superconducting coil pairs and of focusing the electron beam so that it does not spread or get off center along such a distance in passing lengthwise through the wiggler have made this type of device of little practical value as a compact electron beam wiggler. The high inductance of such arrangements makes rapid pulsing to high intensities impractical.

In copending application Ser. No. 526,743 filed Aug. 26, 1983 by the same inventor as the present application, there is described a high energy pulse laser in which an electron beam is generated by an explosive magnetic flux compression generator capable of producing very high energy electron beams of relatively short duration. The electron beam is merged with a laser beam and directed down the axis of a magnetic wiggler which produces a spatially periodic magnetic field which modulates the electron beam and causes it to interact with the photons of the laser beam to amplify the laser beam. In order to maximize the magnetic field in such a laser device, a high current is pulsed through the wiggler in synchronism with the firing of the explosive electron beam generator. However, conventional electromagnetic type wigglers have a high inductance and are not suitable for use with rapidly pulsed currents.

SUMMARY OF THE INVENTION

The present invention is directed to an improved electromagnetic wiggler which has low inductance and therefore is capable of generating much higher flux densities in response to applied voltages of short duration.

In brief, the present invention provides a magnetic wiggler comprising a plurality of closed conductive circular loops having their centers spaced along a common axis. Adjacent loops are joined by straight conductors extending parallel to said axis. The two straight conductors joining any one loop to loops on either side are positioned on diametrically opposite sides of said axis.

DESCRIPTION OF THE DRAWINGS

For a better understanding of the invention, reference should be made to the accompanying drawings, wherein:

FIG. 1 is a perspective view of the magnetic wiggler of the present invention; and FIG. 2 is a schematic of the equivalent circuit of the wiggler of FIG. 1.

DETAILED DESCRIPTION

The conventional wiggler, sometimes referred to as a "barber pole" wiggler, is constructed of two helical conductors that are interlaced and extend along a common axis. The current flows from one end of one helix to the other end and then returns through the second helix. Thus the axial component of current flow is in opposite directions for the two helices. The two helices have the same wrap direction. Such a device produces a transverse component of flux between adjacent loops and off the center axis which changes direction with adjacent turns of the two helices. However, the transverse component of the field goes to zero at the center axis, requiring an interacting electron beam to be annular in shape. Moreover, such a configuration can be shown to have a high inductance which acts to limit the rate at which the current increases when a voltage pulse is applied across the two helical conductors. Thus for very short pulses, this greatly limits the peak flux density which can be achieved.

In contrast, the present invention is directed to a wiggler which, in effect, may be considered as two helical conductors having opposite rather than the same direction of wrap and in which the axial component of current flow through the two helices is in the same direction rather than in opposite directions in the conventional "barber pole" wiggler.

The construction of the wiggler of the present invention is shown in FIG. 1. The wiggler is constructed of a conductor consisting of a plurality of closed loops, as indicated at 10, 12, 14 and 16. These loops are arranged with their centers spaced along a common central axis 18. The individual loops are joined by straight sections of conductor, as indicated at 20, 22, 24 and 26. Each loop is joined to adjacent loops on either side by straight conductors which are positioned diametrically opposite to each other. Thus if a voltage is applied across the two ends of the wiggler, current will flow, as indicated by the arrows in FIG. 1. Thus the current is in the same direction in the straight sections of conductors 20, 22, 24 and 26. The current passing through each length of straight conductor divides and is split substantially equally between the two halves of each loop. Thus the current flowing through the wiggler can be considered as dividing between two conductive paths which form respectively a right-hand helix and a left-hand helix. The two helices intersect first on one side of the axis and then on the other side of the axis. The resulting magnetic field goes to zero at the center of each of the loops, but at a point halfway between each loop, the field has a transverse component which reverses its direction in going from loop to loop.

As shown by the equivalent circuit of FIG. 2, the low inductance wiggler of the present invention approximates a single conductor formed as a string of anti-parallel (reverse current direction) conducting sections. Each section may be considered as having four sides, only two of which link to adjacent loops. Adjacent sections have B fields that are alternately into and out of the plane of the drawing. The return current path is divided so that any cancelling effect is balanced to maintain symmetry of the spatially periodic field within the wiggler. The total flux linkage between sections is therefore small and the resulting self-inductance is comparatively low. It can be shown that the inductance is approximately proportional to $k/2\ N$, where N is the number of sections in the wiggler, compared to $kN^2$ in a conventional coil. This is a reduction of the order of 2N. Since typically a wiggler may have a hundred or more sections, the reduction in inductance is substantial.

What is claimed is:

1. A low inductance wiggler for an electron beam laser comprising:
   a plurality of annular conductors having their centers spaced along a common axis, and a plurality of straight conductors, each pair of adjacent annular conductors being connected by one of said straight conductors, the straight conductors extending parallel to said axis and being alternately positioned on diametrically opposite sides of said axis.

2. The wiggler of claim 1 wherein the plurality of annular conductors and interconnecting straight conductors form a unitary rigid structure with an open passage extending along said axis through the central openings of all the annular conductors.

3. The wiggler of claim 1 further including a pair of conductors extending parallel to said axis and radially outside of said annular conductors, the pair of conductors extending the length of the wiggler and being connected to the annular conductor at one end of the wiggler.

4. A low-inductance magnetic wiggler for a free electron laser comprising an electrical conductor for conducting a current, the conductor being formed with successive portions extending alternately parallel to and transverse to a common axis, the transverse portions having openings therethrough, the openings of the transverse portions being aligned along said common axis.

5. Apparatus of claim 4 wherein the conductor is a rigid self-supporting structure.

* * * * *